US010346900B1

(12) United States Patent
Wilson et al.

(10) Patent No.: US 10,346,900 B1
(45) Date of Patent: Jul. 9, 2019

(54) SYSTEM FOR DETERMINING CONTENT FOR ADVANCE RENDERING

(71) Applicant: AMAZON TECHNOLOGIES, INC., Seattle, WA (US)

(72) Inventors: Nicholas Richard Wilson, Seattle, WA (US); Graeme Kieth Friedrich, Seattle, WA (US); Anoop Balakrishnan, Seattle, WA (US); Janick M. Bernet, Seattle, WA (US); Aaron Lewis Hoosier, Seattle, WA (US); Ronil Sudhir Mokashi, Mercer Island, WA (US); Jason Allan Patrao, Seattle, WA (US); Prashant Verma, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 589 days.

(21) Appl. No.: 15/080,469

(22) Filed: Mar. 24, 2016

(51) Int. Cl.
```
G06F 3/048      (2013.01)
G06Q 30/06      (2012.01)
G06F 3/0484     (2013.01)
G06F 3/0482     (2013.01)
G06F 3/14       (2006.01)
```

(52) U.S. Cl.
CPC ....... *G06Q 30/0641* (2013.01); *G06F 3/0482* (2013.01); *G06F 3/04842* (2013.01); *G06F 3/14* (2013.01)

(58) Field of Classification Search
CPC ...... G06F 3/048; G06F 3/0482; G06F 3/0484; G06F 3/14; G06Q 30/00; G06Q 30/02; G06Q 30/06; G06Q 3/0601; G06N 99/00
See application file for complete search history.

(56) References Cited

U.S. PATENT DOCUMENTS

| | | | | |
|---|---|---|---|---|
| 6,976,147 | B1 * | 12/2005 | Isaac | G06F 12/0862 711/137 |
| 7,437,368 | B1 * | 10/2008 | Kolluri | G06F 17/30864 |
| 9,355,155 | B1 * | 5/2016 | Cassel | G06F 21/552 |
| 9,489,435 | B2 * | 11/2016 | Oel | G01C 21/3608 |

(Continued)

OTHER PUBLICATIONS

Zhong Zhou, "Efficient 3-D Scene Prefetching From Learning User Access Patterns," Jul. 2015, IEEE, vol. 17, No. 7, pp. 1081-1095. (Year: 2015).*

(Continued)

Primary Examiner — Xiomara L Bautista
(74) Attorney, Agent, or Firm — Lindauer Law, PLLC

(57) ABSTRACT

Described are techniques for determining a confidence value associated with the probability that a user will access a particular second user interface by interacting with a first user interface. The confidence value may be determined based on user interaction data indicative of prior interactions by the user. Based on the confidence value, the second user interface may be pre-generated, in advance of user interaction with the first user interface. If the user interacts with the first user interface in a manner that would cause presentation of the second user interface, the user may be provided with the second user interface promptly, avoiding the latency that would normally be experienced during the time that the second user interface is generated. Pre-generation of only the user interfaces indicated by the user interaction data may limit unnecessary use of computing resources.

20 Claims, 8 Drawing Sheets

(56) References Cited

U.S. PATENT DOCUMENTS

| | | | | |
|---|---|---|---|---|
| 9,858,616 B2* | 1/2018 | Greene | ................. | G06Q 10/04 |
| 2009/0094196 A1* | 4/2009 | Piwowarski | ...... | G06F 17/30864 |
| 2012/0271805 A1* | 10/2012 | Holenstein | ........ | G06F 17/30876 |
| | | | | 707/706 |
| 2013/0066819 A1* | 3/2013 | Nice | ................. | G06F 17/30029 |
| | | | | 706/14 |
| 2014/0303953 A1* | 10/2014 | Bates | ..................... | G06Q 30/02 |
| | | | | 703/13 |
| 2014/0372511 A1* | 12/2014 | Kapadia | .................. | H04L 67/02 |
| | | | | 709/203 |
| 2016/0189210 A1* | 6/2016 | Lacey | ................ | G06Q 30/0261 |
| | | | | 705/7.31 |
| 2017/0024807 A1* | 1/2017 | Jhamtani | ............ | G06Q 30/0641 |

OTHER PUBLICATIONS

Corin R. Anderson, "A Machine Learning Approach to Web Personalization," 2002, University of Washington, 152 pages. (Year: 2002).*

* cited by examiner

SYSTEM FOR DETERMINING CONTENT FOR ADVANCE RENDERING

BACKGROUND

Systems may generate web pages or other types of user interfaces in advance of a user's navigation to those pages to reduce user latency.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
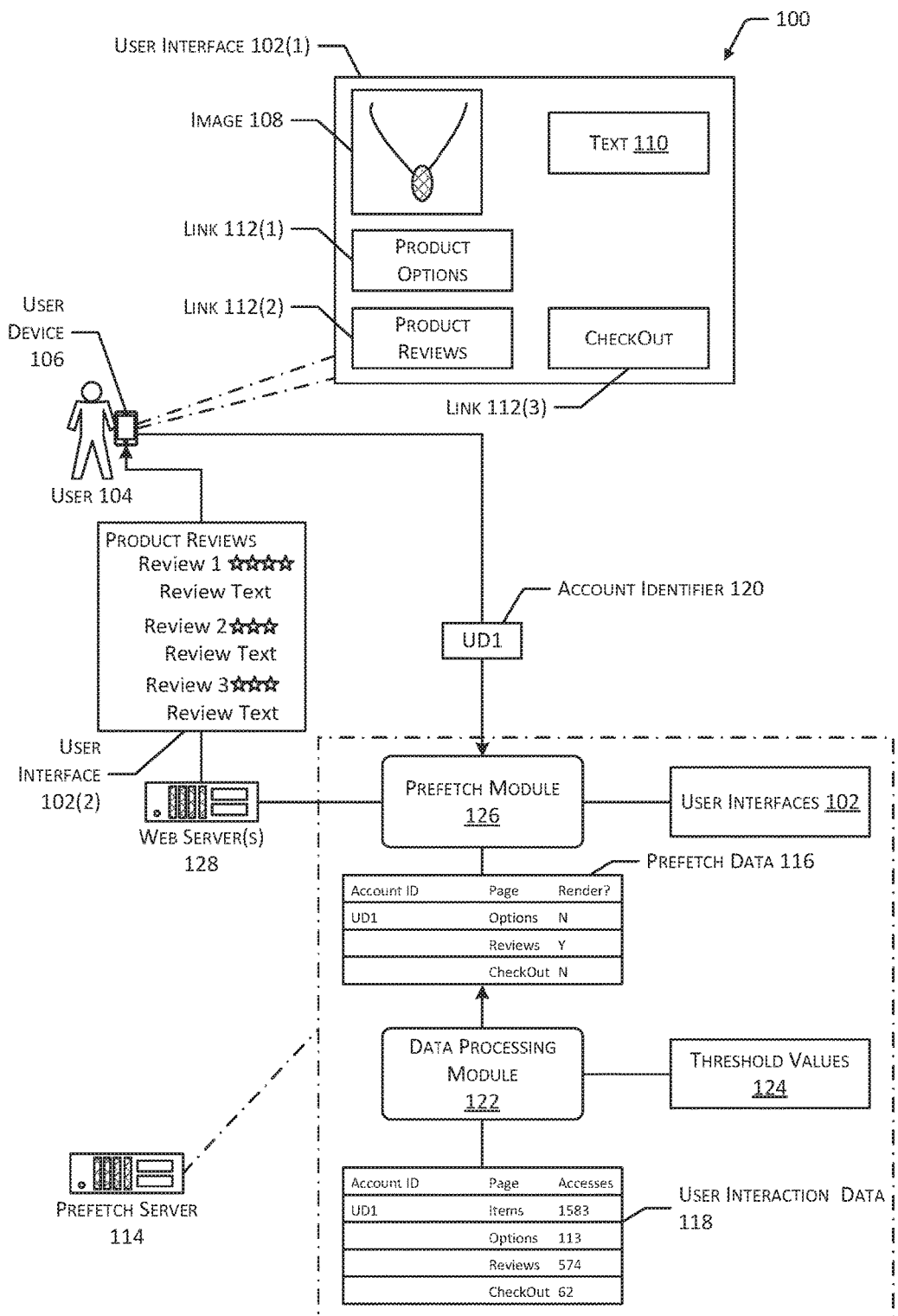
FIG. 1 depicts a system for determining user interfaces to generate in advance of user interactions selecting or navigating to one or more of the user interfaces.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many websites and other types of systems may be configured to provide user interfaces to computing devices, receive user interactions with the user interfaces, then generate and provide subsequent user interfaces or perform other processes responsive to the user interactions. In some cases, generating the subsequent user interfaces or performing subsequent processes may require significant time and computing resources. For example, when a user accessing an online marketplace selects to begin a "checkout" process to purchase one or more items, multiple services or processes may be accessed. Continuing the example, a process to purchase an item may include sub-processes to calculate applicable tax rates, shipping options, shipping costs, payment methods, available funds or credit, and so forth. Due to the large number of involved processes or services and the large quantity of computing resources used to complete the overall purchase process, a user may experience significant latency while the user interfaces associated with purchasing of an item are generated. Such latency may be especially apparent during times of peak use when any particular sub-process may be experiencing a significant load. A negative user experience may cause a user to abandon the purchase process, resulting not only in lost revenue associated with the current purchase, but also lost revenue associated with future purchases by the user, or by other users that may receive negative feedback from the user.

To improve the user experience, subsequent user interfaces, such as the purchase process for an item, may be generated in advance of a user interaction that would begin the purchase process, such that when the user commences the purchase process, the pre-generated subsequent user interfaces may be provided to the user nearly instantaneously. However, in cases where a user does not elect to commence the purchase process, pre-generation of user interfaces may unnecessarily consume computing resources. In most cases, the pre-generation of user interfaces for a large number of users exceeds the computing capabilities of the associated systems. Additionally, pre-generation of unused user interfaces may consume bandwidth associated with a user account or device. For example, if a user is accessing a website using a mobile device that is subject to a limited quantity of transmitted and received data, pre-generation of unused user interfaces may unnecessarily consume the limited quantity of data associated with the mobile device.

Described in this disclosure are techniques for predicting user interactions with a user interface currently provided to a user, based on data indicative of previous user interactions. For example, a user account may access a first user interface, from which one or more other user interfaces are accessible. User interaction data associated with the user account may indicate a number of times the user account has previously accessed the first user interface and a number of times the user account has previously accessed one or more of the other user interfaces by interacting with the first user interface. Based on the ratio of the number of times the user has accessed a particular one of the other user interfaces versus the total number of times the user has accessed the first user interface, a confidence value or other type of predictive score for the particular user interface may be determined. If the score exceeds a threshold, prefetch data indicating the particular user interface may be generated and associated with the user account. Based on the user interaction data for a user account across multiple user devices, across multiple sessions interacting with a system, and across an extended time period, such as two years, the prefetch data may include multiple user interfaces. When the user account accesses a first user interface that links to one or more other user interfaces, correspondence between the other user interfaces and the prefetch data for that user account may be used to determine which other user interfaces, if any, are likely to be accessed by the user account. Based on this determination, at least a subset of the other user interfaces may be generated (e.g., rendered) in advance of user interaction with the first user interface.

In addition to a number of times a user account has accessed particular user interfaces, the user interaction data may include particular devices or device types used to access particular user interfaces. For example, a user may search for items and read reviews regarding the items using a mobile device but may be more likely to complete a purchase process for an item using a desktop computer. As a result, the purchase process may be pre-generated for that user account if the preceding user interface is accessed using the user's desktop computer, but not if accessed using other user devices. Similarly, user interaction data may indicate particular browser applications or other software used to access user interfaces, particular categories of items, specific items, financial costs of items, and so forth. For example, the purchase history associated with a user account may indicate an increased likelihood that a user may choose to purchase an electronic item, and a decreased likelihood that the user will choose to purchase a kitchen item. Based on this determination, the purchase process for electronic items may be pre-generated in advance of user interaction, while the purchase process for kitchen items may not be generated unless the user selects to begin the purchase process. As other examples, the search history, browsing history, or purchase history for a user account may indicate an increased likelihood that the user will choose to purchase items having positive reviews or ratings that exceed a certain threshold or items having financial costs that fall within certain ranges. In other implementations, the user interaction data may include characteristics associated with the user account. For example, user interaction data may include one or more locations associated with the user account, such as a user's residential or business address, financial data associated with a user account, such as a payment method, an age of the user account, and so forth.

In some implementations, the financial cost of an item may be used to determine whether a user interface is pre-generated in advance of user interaction. For example, if an item exceeds a threshold financial value, the user interface(s) associated with the purchase process for the item may be rendered in advance of user interaction to minimize the likelihood that the user will abandon the purchase process due to latency or other potential errors. In some cases, a particular user interface may be provided to the user account to facilitate the purchase of an item having a financial value in excess of a threshold. For example, when a user account accesses an interface to view a high value item, such as an expensive electronic item or piece of jewelry, a chat interface to facilitate the purchase of the item may be provided to the user account. As another example, if a user account's payment method is declined or if an error occurs during the purchase process, a chat interface or another type of user interface may be provided to the user account to attempt to facilitate the purchase process and prevent the user from abandoning the purchase.

The prefetch data for user accounts may be modified periodically or continuously, such as through one or more machine learning techniques. For example, if a particular type of user interface data, such as the time of day that a user accesses a website, is determined to have an insignificant effect on a user's selection to access one or more user interfaces, the times associated with previous user interactions may be disregarded or provided with a smaller weight when determining predictive scores. As another example, if the frequency at which a user account accesses a particular website is determined to significantly affect the likelihood that a user account will complete a purchase of an item using the website, the frequency of access associated with the user account may be provided with a greater weight when determining predictive scores. In some implementations, the user interfaces that are accessed by a user account and the number of unused pre-generated user interfaces may affect the prefetch data. For example, if a larger number of pre-generated user interfaces are not accessed after generation, the user interaction data that caused these user interfaces to be pre-generated may be provided with a smaller weight when determining predictive scores. As another example, if a larger number of user interfaces that were not pre-generated are accessed by a user account, the user interaction data that would have caused these user interfaces to be pre-generated may be provided with a larger weight when determining predictive scores.

A user account may have specific prefetch data associated therewith, the prefetch data indicating particular user interfaces to be pre-generated prior to an interaction from the user account. In some implementations, the prefetch data may also indicate particular circumstances during which user interfaces may be pre-generated, such as particular dates or times, when accessed using particular devices, when the user device is located in a particular location, and so forth. Use of prefetch data specific to a user account may enable a set of user interfaces to be pre-generated that will maximize reduction in user latency while minimizing wasted computing resources and network bandwidth.

FIG. 1 depicts a system 100 for determining user interfaces 102 to generate, in advance of user interactions selecting or navigating to one or more of the user interfaces 102. For example, a user 104 associated with a user device 106 may access a first user interface 102(1), such as a webpage associated with an online marketplace. Continuing the example, the first user interface 102(1) may include information associated with one or more items available for purchase. Such information may include features presented in the user interface 102(1) such as images 108 depicting one or more items, text 110 describing the item(s), or one or more other types of content, such as audio or haptic output.

The first user interface 102(1) may also include one or more links 112 that may be used to access additional user interfaces 102. For example, the links 112 may include buttons, selectors, hyperlinks associated with images 108 or text 110, search interfaces, or other features that may be used to navigate from the first user interface 102(1) to one or more other user interfaces 102. Continuing the example, a first link 112(1) may be used to navigate to a user interface 102 associated with "product options", such as available colors, sizes, styles, or other features associated with the item depicted in the first user interface 102(1). A second link 112(2) may be used to navigate to a user interface 102 associated with "product reviews" associated with the item, such as ratings and comments generated by other users 104 that have purchased the item. A third link 112(3) may be used to purchase the item, through a "CheckOut" process, which may include providing one or more user interfaces 102 associated with payment and shipping options, and executing services associated with tax calculations, shipping calculations, payment verifications, and so forth.

Generation of the user interfaces 102 associated with one or more of the links 112 may require significant time and computing resources, such that after selecting a link 112, the user 104 may perceive latency before the associated user interface 102 is provided to the user device 106. To reduce the latency perceived by the user 104, one or more subsequent user interfaces 102 may be generated in advance of user interaction with the first user interface 102(1), such that after selection of a corresponding link 112 by the user 104, the pre-generated user interface 102 may be output by the user device 106 nearly instantly. However, the pre-generation of user interfaces 102 that are not selected by the user 104 may unnecessarily consume computing resources.

To determine which user interfaces 102, if any, to generate in advance of user interaction, the system 100 may include one or more prefetch servers 114 configured to generate prefetch data 116 associated with a user 104. While FIG. 1 depicts a single prefetch server 114, the prefetch server 114 may include any number and any type of computing device, including, without limitation, mobile devices, set-top boxes, tablet computers, personal computers, wearable computers, servers, and so forth. For example, the prefetch server 114 may include a first computing device that determines a score, confidence value, or other metric based on prior user interactions, and a second computing device that generates prefetch data 116 based on the determinations provided by the first computing device. Additionally, while FIG. 1 depicts the prefetch server 114 as a separate computing device, in some implementations, the functions described with regard to the prefetch server 114 may be performed by other servers or computing devices. For example, the functions of the prefetch server 114 may be performed by one or more services operating on virtual or physical host devices that perform other functions, such as accessing stored information associated with users 104 or items, rendering or providing user interfaces 102 to user devices 106, and so forth. The prefetch server 114 may access user interaction data 118 indicative of prior actions associated with a user account of the user 104. In some implementations, user interaction data 118 may include clickstream data associated with a particular user account. User interaction data 118 may also include one or more of a purchase history, a browsing history, or a search history associated with the user account. User interaction data 118 may further include characteristics of the user account, such as demographic information associated with the user 104, an age associated with the user account, one or more locations associated with the user account, and so forth. User interaction data 118 may additionally include characteristics of the user interfaces 102 accessed by a user account. For example, a user 104 associated with the user account may have searched, purchased, or viewed webpages associated with a particular category of items, such as mystery novels, or a particular type of content, such as product reviews. User interaction data 118 may also include indications of user interfaces 102 previously accessed by the user account. For example, the user interaction data 118 may include an indication of the total number of times the user account has accessed the first user interface 102(1) and the user interfaces 102 associated with the first link 112(1), the second link 112(2), and the third link 112(3).

Continuing the example, FIG. 1 depicts user interaction data 118 including an account identifier 120 associated with the user account of the user 104, and an indication of multiple user interfaces 102 previously accessed by the user account. Specifically, the example user interaction data 118 indicates that the user account "UD1" has accessed user interfaces 102 associated with item information (e.g., "Items") on 1583 occasions, user interfaces 102 associated with product options (e.g., "Options") on 113 occasions, user interfaces 102 associated with product reviews (e.g., "Reviews") on 574 occasions, and user interfaces 102 associated with purchasing products (e.g., "CheckOut") on 62 occasions. A data processing module 122 associated with the prefetch server 114 may determine particular elements from the user interaction data 118 and may generate the prefetch data 116 based on the user interaction data 118 using one or more models, algorithms, threshold values 124, and so forth. In some implementations, the data processing module 122 may determine a predictive score based on one or more elements of the user interaction data 118, then determine the prefetch data 116 based on the score. For example, a first process, module, or computing device may determine predictive scores based on the user interaction data 118 while a separate process, module, or computing device may generate prefetch data 116 for one or more user accounts based on the scores.

An example algorithm for determining a confidence value or other type of predictive score associated with the decision to render in advance a particular user interface 102 for a particular user account may include:

$$A*(U_2/U_1)+L+T$$

In the above example algorithm, "$U_1$" may include a number of instances that a user account accessed a first user interface 102(1) during a previous length of time, such as two years. "$U_2$" may include a number of instances that the user account accessed a particular second user interface 102(2) by interacting with the first user interface 102(1). Thus the expression "$U_2/U_1$" may represent a ratio or probability, for each access to the first user interface 102(1), that the user account may access the second user interface 102(2). The coefficient "A" may include a weight assigned to the ratio of "$U_2$" to "$U_1$". The constant "L" may include a value added to or subtracted from the predictive score based on a location associated with the user account. For example, users in New England may demonstrate a greater propensity to purchase particular types of items when compared to users in Texas. The constant "T" may include a value added or subtracted from the predictive score based on the current time. For example, users may demonstrate a greater propensity to purchase items during the month of November than during the month of January. The specific values of "A", "L", "T", or any other variables may be determined through use of various machine learning techniques and may be modified as additional user interaction data 118 is generated. While the example algorithm includes only five values, for the purpose of illustration, it should be understood that any number of elements that may be determined from the user interaction data 118 may be used to calculate a confidence value or other type of predictive score. Additionally, any number of coefficients having any value may be used to add or reduce the weight of particular elements of user interaction data 118, and any number of constants having any value may increase or decrease the resulting confidence value or other predictive score.

In some implementations, the data processing module 122 may determine correspondence between one or more determined scores, or particular elements of the user interaction data 118, and one or more threshold values 124. For example, a threshold value 124 of 0.25 associated with user accesses to a particular user interface 102 may be applied to the example user interaction data 118 shown in FIG. 1. Continuing the example, the depicted first user interface 102(1) may be associated with the output of information associated with "Items". A user interface 102 associated with "Options" may be accessible using the first link 112(1). A user interface 102 associated with "Reviews" may be accessible using the second link 112(2). A user interface 102 associated with "CheckOut" may be accessible using the third link 112(3). The ratio of accesses for the "Options" user interface 102 ("113") to accesses for the "Items" user interface 102 ("1583") would be less than 0.25. The ratio of accesses for the "Reviews" user interface 102 ("574") to accesses for the "Items" user interface 102 ("1583") would be greater than 0.25. The ratio of accesses for the "Check-Out" user interface 102 ("62") to accesses for the "Items" user interface 102 ("1583") would be less than 0.25. Based on these determinations, the data processing module 122 may generate prefetch data 116 indicating that for the user account associated with the account identifier 120 "UD1", the "Reviews" user interface 102 should be pre-generated in advance of user interaction with the first user interface 102(1).

A prefetch module 126 associated with the prefetch server 114 may determine access, by a user account, to the first user interface 102(1). For example, the prefetch module 126 may determine the account identifier 120 associated with the user account from the user device 106. Continuing the example, the user 104 may provide information, via the user device 106, to login or otherwise access the user account. Credentials or other identifiers associated with the user account may then be determined when the user device 106 accesses the first user interface 102(1).

Responsive to the determined access to the first user interface 102(1), the prefetch module 126 may determine at least a portion of the subsequent user interfaces 102 that are accessible via interaction with the first user interface 102(1). For example, each of the links 112 may be used to access a particular user interface 102. The prefetch module 126 may determine correspondence between the prefetch data 116 and the accessible user interfaces 102. For example, the prefetch data 116 may indicate one or more particular user interfaces 102 to be generated in advance of user interaction. The prefetch data 116 shown in FIG. 1 indicates that the user interface 102 associated with "Reviews" may be pre-generated, while other user interfaces (e.g., "Options" and "CheckOut") may not be pre-generated. Continuing the example, the prefetch module 126 may determine that the second link 112(2) may be used to access a second user interface 102(2) associated with product reviews (e.g., "Reviews"). The prefetch data 116 may indicate that the second user interface 102(2) should be rendered in advance of user interaction with the first user interface 102(1).

Based on the correspondence between the prefetch data 116 and the second user interface 102(2), the prefetch module 126 may cause the second user interface 102(2) to be generated prior to receiving a user interaction with the first user interface 102(1). For example, the prefetch module 126 may provide an indication of the second user interface 102(2), to be pre-generated, to one or more web servers 128, which may generate the second user interface 102(2). In some cases, the web server 128 and the prefetch server 114 may include the same computing device, group of computing devices, virtualized host devices, and so forth. For example, the functions associated with the prefetch server 114 may be performed by one or more services executing on the web server 128. In some implementations, the second user interface 102(2) may be generated and retained in association with the web server(s) 128 until requested by the user device 106. In other implementations, the second user interface 102(2) may be rendered by one or more of the web server(s) 128 or the user device 106. In still other implementations, the second user interface 102(2) may be provided to the user device 106 in advance of user interaction with the first user interface 102(1). If a subsequent user interaction with the first user interface 102(1) includes selection of the second link 112(2) or another action that would cause the second user interface 102(2) to be presented, the pre-generated second user interface 102(2) may be output by the user device 106 rapidly, reducing the latency that may have been experienced by the user 104 had the second user interface 102(2) not been previously generated.

Figure 2:
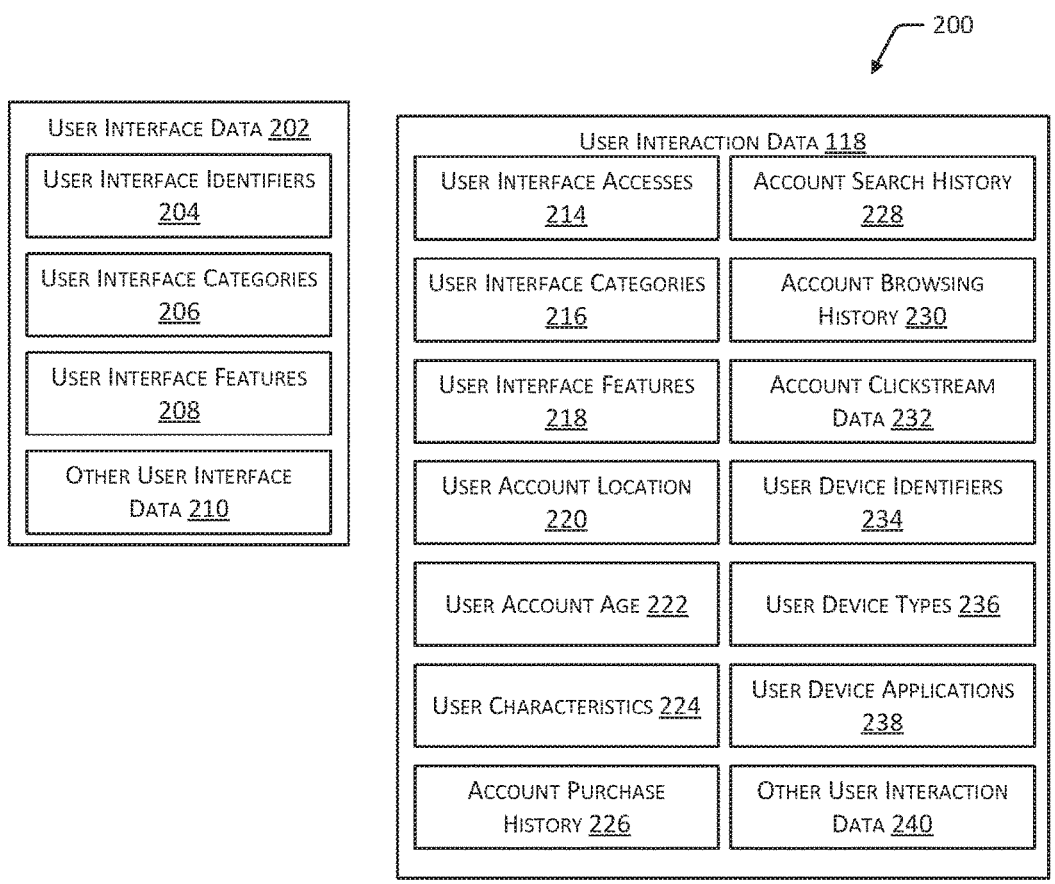
FIG. 2 depicts block diagrams illustrating example prefetch data, user interaction data, and user interface data used to generate user interfaces.
Figure 2:
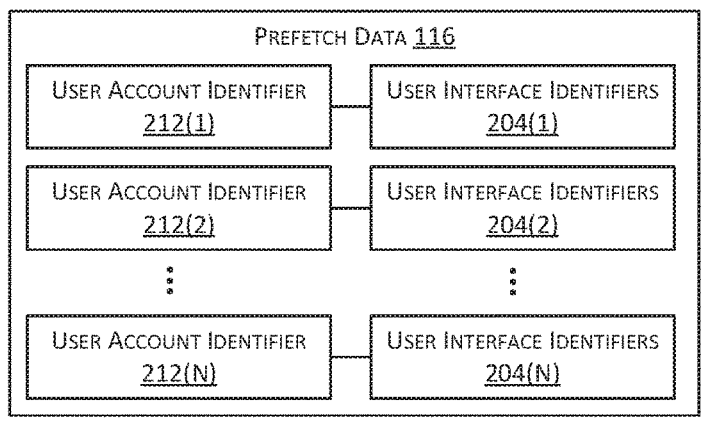

FIG. 2 depicts block diagrams 200 illustrating example prefetch data 116, user interaction data 118, and user interface data 202 used to generate user interfaces 102. User interface data 202 may include data indicative of or used to generate one or more user interfaces 102. For example, user interface data 202 may include code, style elements, and so forth used to render a webpage.

The user interface data 202 may include one or more user interface identifiers 204. User interface identifiers 204 may include any manner of alphanumeric data, audio data, image data, metadata, or other types of data that may be used to differentiate a particular user interface 102 from other user interfaces 102. For example, a user interface identifier 204 may include a file name, a title, a unique alphanumeric string, and so forth. In some implementations, a user interface identifier 204 may include data that may be identifiable by a computing device that may not necessarily be understandable to a human operator.

The user interface data 202 may also include one or more user interface categories 206. User interface categories 206 may include data indicative of a type or one or more characteristics of a user interface 102. For example, a user interface category 206 may include data indicating that a user interface 102 is a web page, a search interface, a list or menu, a field for receiving alphanumeric data, or other types of user interfaces 102. User interface categories 206 may also indicate one or more characteristics of the content presented in a user interface 102. For example, a user interface category 206 may include data indicating that a user interface 102 is a web page containing information regarding an item available for purchase, a web page associated with selection of a shipping method after purchasing an item, a search interface for locating available items of a particular type, and so forth.

The user interface data 202 may additionally include one or more user interface features 208. User interface features 208 may include elements of a user interface 102 that are presented to a user 104, such as images 108, text 110, audio or video output, haptic output, olfactory output, and so forth. User interface features 208 may also include style elements, such as the layout, position, font, color pattern or other characteristics associated with the format of a user interface 102.

Other user interface data 210 may include data or metadata indicative of an author of a user interface 102, indications of other user interfaces 102 that are linked to or associated with a particular user interface 102, indications of access credentials or security features associated with a user interface 102, and so forth.

Prefetch data 116 may be used to determine one or more user interfaces 102 to be generated, for a particular user account, prior to user interaction from that user account. The inclusion of user interfaces 102 in the prefetch data 116 may indicate a probability (e.g., a confidence value or other predictive score), in excess of a threshold value, that a user account will access the included user interface 102. As such, the prefetch data 116 may function as a user-specific portfolio of user interfaces 102 to be pre-generated for a particular user account based on prior interactions undertaken by the user account. For example, the prefetch data 116 may include a first user account identifier 212(1) associated with a particular account. The first user account identifier 212(1) may include an account name, a user name, or any other type of alphanumeric data, audio data, image data, and so forth that may be used to differentiate a first user account from other user accounts. The first user account identifier 212(1) may be stored in association with a first set of one or more user interface identifiers 204(1).

As discussed with regard to FIG. 1, when the user account associated with the first user account identifier 212(1) accesses a first user interface 102(1), a prefetch server 114 or another type of computing device may determine one or more other user interfaces 102 that are accessible by interacting with the first user interface 102(1). The prefetch server 114 may determine correspondence between the accessible other user interfaces 102 and the user interface identifiers 204(1) of the prefetch data 116 that are associated with the first user account identifier 212(1). The accessible user interfaces 102 that correspond to the prefetch data 116 may be generated in advance of interaction, by the user account, with the first user interface 102(1). In some implementations, the generated user interfaces 102 may be rendered, provided to a user device 106 associated with the user account, or both. If a subsequent user interaction with the first user interface 102(1) includes an interaction that would cause one of the pre-generated user interfaces 102 to be presented, the pre-generated user interface 102 may be output by the user device 106 nearly instantaneously, reducing the latency perceived by the user 104. Use of the prefetch data 116 to determine which, if any, of the user interfaces 102 to pre-generate may reduce the number of user interfaces 102 that are generated but not accessed by the user account, reducing unnecessary use of computing resources.

Similarly, the prefetch data 116 may include a second user account identifier 212(2) stored in association with a second set of user interface identifiers 204(2), and any number of additional user account identifiers 212(N) stored in association with any number of user interface identifiers 204(N). The prefetch data 116 may indicate any number of user interfaces 102, specific to particular user accounts, that may be pre-generated prior to user interaction by the corresponding user accounts, based on a probability that the user account will access the pre-generated user interfaces 102.

In some implementations, the prefetch data 116 may include an indication of one or more processes to be performed in advance of user interaction with a particular user interface 102. For example, based on user interaction data 118 for a particular user account, it may be determined that the user account is likely to initiate a series of processes to purchase an item. One or more of the processes performed to complete the purchase of the item may not result in the output of user interfaces 102 to a user device 106. However, based on the prefetch data 116 associated with the user account, the processes may be initiated in advance of user interaction with a particular user interface 102, such that if the user account initiates the purchase process, the results of the initiated processes may be determined while minimizing latency experienced by the user 104. In other implementations, the prefetch data 116 may include user interface identifiers 204 associated with user interfaces 102 that are not directly accessible from a current user interface 102 presented to a user device 106. For example, based on user interaction data 118, it may be determined that a user account is likely to access a particular user interface 102 that is not accessible by interacting with the current user interface 102. The particular user interface 102 may be generated in advance of user interaction such that if the user account accesses the particular user interface 102 at a future time during a session, the pre-generated user interface 102 may be provided to the user device 106 while minimizing latency experienced by the user 104.

The user interaction data 118 may be indicative of any prior interactions with any user interface 102 undertaken by a user account and may be used to determine the prefetch data 116. For example, the user interaction data 118 may include indications of user interface accesses 214 by one or more user accounts. User interface accesses 214 may include indications of instances that a particular user account accessed a particular user interface 102. For example, a user interface access 214 may include a user interface identifier 204 indicative of the accessed user interface 102 stored in association with a user account identifier 212 indicative of the user account accessing the user interface 102. A user interface access 214 may also include indications of other characteristics of the access, such as a time, a duration, a user device 106, software executing on the user device 106 (e.g., a browser application), and so forth. As one example, user interface accesses 214 may include indications of particular webpages that are provided to a user device 106 responsive to user input. As another example, user interface accesses 214 may include other features or elements of a user interface 102 that are accessed by a user device 106 without necessarily presenting content to the user device 106. Continuing the example, user input may be used to add an item to an electronic "shopping cart" or "wish list" without presenting additional content to a user device 106. As another example, user input may be used to mark, highlight, flag, or otherwise indicate particular content in a user interface 102 for subsequent reference by a user 104.

User interface accesses 214 may be used to determine the prefetch data 116 by indicating a probability that a user account may access a particular user interface 102. For example, if a user account has selected to access user interfaces 102 relating to product reviews over 50 percent of the time after viewing a webpage describing an item available for purchase, these previous user interface accesses 214 may be used to determine predictive scores associated with the user interfaces 102 relating to product reviews. The prefetch data 116 generated based on the user interaction data 118 may include an indication that user interfaces 102 relating to product reviews may be pre-generated in advance of user interaction for the corresponding user account. User interface accesses 214 may also include an indication of the times that particular user interfaces 102 were accessed. For example, the frequency at which a particular user interface 102 is accessed may affect the prefetch data 116 determined based on the user interaction data 118. As another example, the most recent previous interaction by a user account may affect the prefetch data 116.

User interaction data 118 may also include indications of user interface categories 216 and user interface features 218. User interface categories 216 may include indications of a type of user interface 102 accessed by a user account. For example, user interface categories 216 may indicate that a particular user interface 102 is a webpage, a search interface, a drop-down menu, and so forth. As another example, user interface categories 216 may indicate the nature of content presented in the particular user interface 102. For example, user interface categories 216 may indicate that a particular user interface 102 includes information regarding an item available for purchase, a search interface for locating items, an interface for selecting payment or shipping methods, and so forth. User interface features 218 may include indications of particular content or types of content present in a particular user interface 102. For example, user interface features 218 may include indications of images 108, text 110, or other types of output, formatting or style elements of a user interface 102, and so forth.

User interface categories 216 and user interface features 218 may be used to determine the prefetch data 116 by indicating a probability that a user account may access user interfaces 102 having a particular user interface category 216 or user interfaces 102 having particular user interface features 218. For example, the user interaction data 118 may indicate that a particular user account has selected to purchase an item more than 50 percent of the time after viewing product reviews for the item indicating an average rating greater than a certain value. As another example, the user interaction data 118 may indicate that a particular user account has selected to purchase an item more than 50 percent of the time if the user interface 102 describing the item includes text 110 indicating the dimensions and weight of the item. The prefetch data 116 generated based on the user interaction data 118 may include an indication that user interfaces 102 having certain user interface categories 216 or user interface features 218 may be pre-generated in advance of user interaction for the corresponding user account.

User interaction data 118 may also include data specific to particular user accounts or users 104. For example, the user interaction data 118 may include indications of user account locations 220. User account locations 220 may include static locations, such as residential or business addresses associated with a user account, or dynamic locations, such as the current location of a user device 106 at the time that a user interaction was performed. The user interaction data 118 may also include an indication of user account age 222, which may indicate the date that a user account was generated, the length of time the user account has been active, the frequency with which the user account has been used or accessed particular user interfaces 102, and so forth. The user interaction data 118 may further include indications of one or more user characteristics 224, such as demographic information associated with a user 104, financial information regarding a user 104, and so forth.

User account locations 220, user account age 222, and user characteristics 224 may be used to determine the prefetch data 116. For example, the user interaction data 118 may indicate that users 104 who reside in the state of New York are likely to access a particular user interface 102 50 percent of the time or more. The user account ages 222 of one or more user accounts may be used to modify the weight applied to the characteristics of particular user accounts when determining the prefetch data 116. For example, characteristics determined for a newly created user account or a user account that is only infrequently used may be afforded less weight than characteristics associated with an established user account that is frequently used when determining the prefetch data 116.

Additional user interaction data 118 associated with a user account may include an account purchase history 226, an account search history 228, and an account browsing history 230. User interaction data 118 may also include account clickstream data 232, which may include indications such as the dwell times of a particular user account at particular user interfaces 102, the position of a mouse cursor or other input device, or indications of other portions of user interfaces 102 that are selected or otherwise indicated by a user device 106. For example, the user interaction data 118 may indicate that user accounts associated with the purchase of a first item have a likelihood of greater than 50 percent to purchase a second related item. Based on this determination, the prefetch data 116 may indicate that user interfaces 102 related to the second item may be pre-generated in advance of user interaction.

User interaction data 118 may also include data associated with particular user devices 106. For example, the user interaction data 118 may include user device identifiers 234 associated with one or more user devices 106. The user device identifiers 234 may include any manner of alphanumeric data, audio data, image data, metadata, or other types of data that may be used to differentiate a particular user device 106 from other user devices 106. For example a user device identifier 234 may include a network address, such as an internet protocol (IP) address, a device name or serial number, a media access control (MAC) address, and so forth. User interaction data 118 may also include indications of user device types 236. For example, the user interaction data 118 may indicate whether a user device 106 is a desktop computer, a laptop computer, tablet computer, a smartphone, or another type of computing device. User device types 236 may also include types of hardware associated with a user device 106, such as input devices, output devices, and so forth. For example, the user device types 236 may indicate whether a particular user device 106 includes a display and the capabilities of the display, whether a particular user device 106 includes speakers, and so forth. In some implementations, the user interaction data 118 may include indications of user device applications 238 executed by user devices 106. For example, a user device application 238 may include a browser application used to access and present a user interface 102.

User interaction data 118 associated with user devices 106 may be used to determine the prefetch data 116. For example, users 104 currently accessing a user interface 102 via a desktop computer may have a greater likelihood to begin a purchase process for an item than users 104 using a smartphone. However, users 104 using a smartphone may have a greater likelihood of accessing search interfaces and product reviews. Based on these determinations, user interfaces 102 associated with a purchase process may be pre-generated responsive to access by a desktop computer while user interfaces 102 associated with product reviews and performing product searches may be pre-generated responsive to access by a smartphone.

Other user interaction data 240 may include other data that may be determined regarding a user interface 102, user 104, user device 106, or user account that may indicate a likelihood of accessing one or more user interfaces 102. For example, user account features, such as access credentials or other security features, may affect a user experience in a manner that increases or decreases the probability that a user may begin the purchase process for an item. As another example, movement data indicating motion of a user device 106 may indicate that a user 104 is currently traveling and is unlikely to purchase an item during a current access to a user interface 102.

Figure 3:
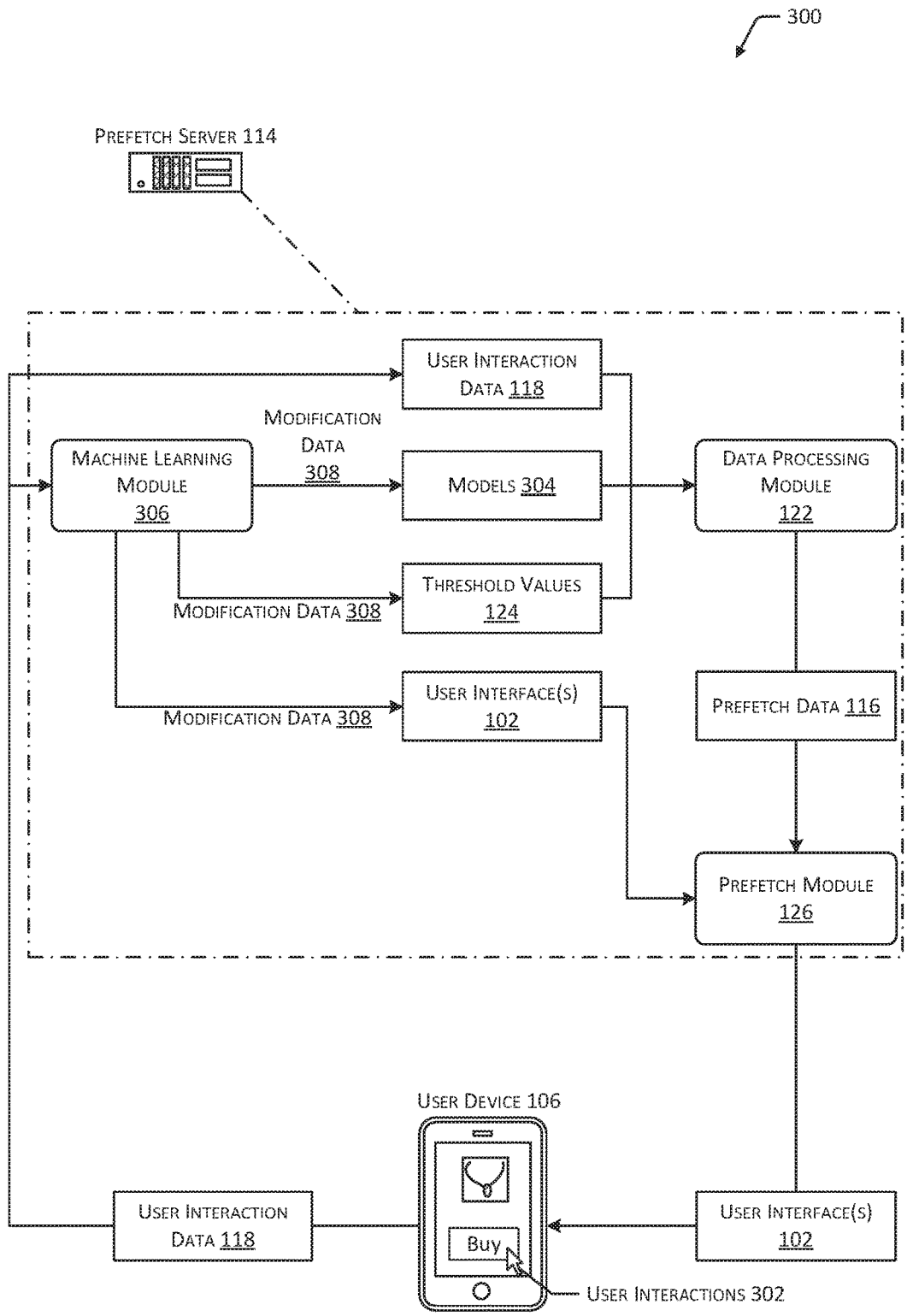
FIG. 3 depicts a system for modifying prefetch data based on user interactions with one or more user interfaces.

FIG. 3 depicts a system 300 for modifying prefetch data 116 based on user interactions 302 with one or more user interfaces 102. As discussed with regard to FIG. 1, prefetch data 116 may indicate particular user interfaces 102, for particular user accounts, to be generated in advance of user interaction 302 by the user accounts. The prefetch data 116 may be generated based on user interaction data 118, which may include various types of data indicative of prior user interactions 302 with user interfaces 102, characteristics of user accounts, characteristics of user devices 106, characteristics of users 104, and characteristics of the user interfaces 102 accessed by the user accounts.

A data processing module 122 associated with the prefetch server 114 may apply one or more models 304, threshold values 124, or both models 304 and threshold values 124 to at least a portion of the user interaction data 118 to determine particular user interfaces 102 to be generated in advance of user interaction 302. For example, a model 304 may assign weights to particular elements of user interaction data 118 and determine predictive scores for a particular user interface 102 based on the particular elements of user interaction data 118. If the predictive scores exceed a corresponding threshold value 124, an indication of the particular user interface 102 may be included in the prefetch data 116. In other implementations, threshold values 124 may be directly applied to one or more elements of user interaction data 118. For example, the threshold values 124 may include a threshold number of instances for a user account to access a user interface 102. If the user interaction data 118 indicates that a user account has accessed a particular user interface 102 for a number of instances that equals or exceeds the corresponding threshold value 124, the particular user interface 102 may be included in the prefetch data 116.

When a user device 106 accesses a first user interface 102(1), a prefetch module 126 associated with the prefetch server 114 may determine correspondence between other user interfaces 102 accessible from the first user interface 102(1) and the prefetch data 116. One or more of the other user interfaces 102 included in the prefetch data 116 may be generated in advance of user interaction 302 with the first user interface 102(1). Subsequently, the user account may provide one or more user interactions 302 to the first user interface 102(1). If the user interactions 302 include accessing a pre-generated user interface 102, the pre-generated use interface 102 may be provided to the user device 106 without requiring generation thereof. If the user interactions 302 do not access the pre-generated user interface 102, then the pre-generated user interface 102 may be stored for future use or deleted. The particular user interface 102 accessed by the user interactions 302 may be generated and provided to the user device 106 for presentation.

Additional user interaction data 118 indicative of the user interactions 302 provided by the user device 106 may subsequently be used by the data processing module 122 to modify the prefetch data 116. For example, as user devices 106 access particular user interfaces 102 over time, the number of user interface accesses 214 for the particular user interfaces 102 may change. As another example, as different user device types 236 and user device applications 238 are used to access user interfaces 102, these user interactions 302 may result in modifications or additions to the user interaction data 118. As yet another example, if a user account location 220 or other characteristics of a user account are modified, these changes may affect the user interaction data 118 and the resulting prefetch data 116. As another example, if the content of one or more of the user interfaces 102 is modified, the user interface categories 216 or user interface features 218 of the user interaction data 118 may change.

Additionally, user interaction data 118 associated with the user interactions 302 provided by the user device 106 may be processed by a machine learning module 306 associated with the prefetch server 114. For example, the machine learning module 306 may determine, based on the user interactions 302, which of the pre-generated user interfaces 102 were accessed by the user account and which pre-generated user interfaces 102 were not accessed. The machine learning module 306 may also determine user interfaces 102 that were accessed by the user account but were not pre-generated. Based on these determinations, the machine learning module 306 may modify the models 304 or threshold values 124. For example, if a significant number of unused user interfaces 102 were pre-generated based on the fact that the associated user accounts included a particular user account location 220, the machine learning module 306 may provide modification data 308 to modify one or more of the models 304 by reducing the weight of the user account location 220 in subsequent determinations. The prefetch data 116 may then be modified by the data processing module 122 based at least in part on the modified models 304. As another example, if a large number of unused user interfaces 102 are pre-generated based on one or more elements of user interaction data 118, the machine learning module 306 may provide modification data 308 to increase one or more threshold values 124. The threshold values 124 may correspond to predictive scores that the score associated with a particular user interface 102 must meet or exceed before an indication of the user interface 102 is included in the prefetch data 116. As a result, a smaller number of user interfaces 102 may be included in the prefetch data 116 and pre-generated. In other cases, the machine learning module 306 may increase the weight of certain user interaction data 118 in the models 304 or decrease one or more threshold values 124, such that a larger number of user interfaces 102 are pre-generated.

In some implementations, the machine learning module 306 may also provide modification data 308 to cause one or more user interfaces 102 to be modified. For example, if particular user interface features 218 are determined to result in more efficient use of pre-generated user interfaces 102, purchases of items, or other desirable user interactions 302, the machine learning module 306 may modify one or more user interfaces 102 to include the particular user interface features 218. Continuing the example, if a particular placement of images 108, product reviews, or other content may positively affect the probability that a user account will access a subsequent user interface 102 associated with a purchase process, modification data 308 may be generated to modify the user interface 102 to include such content.

Figure 4:
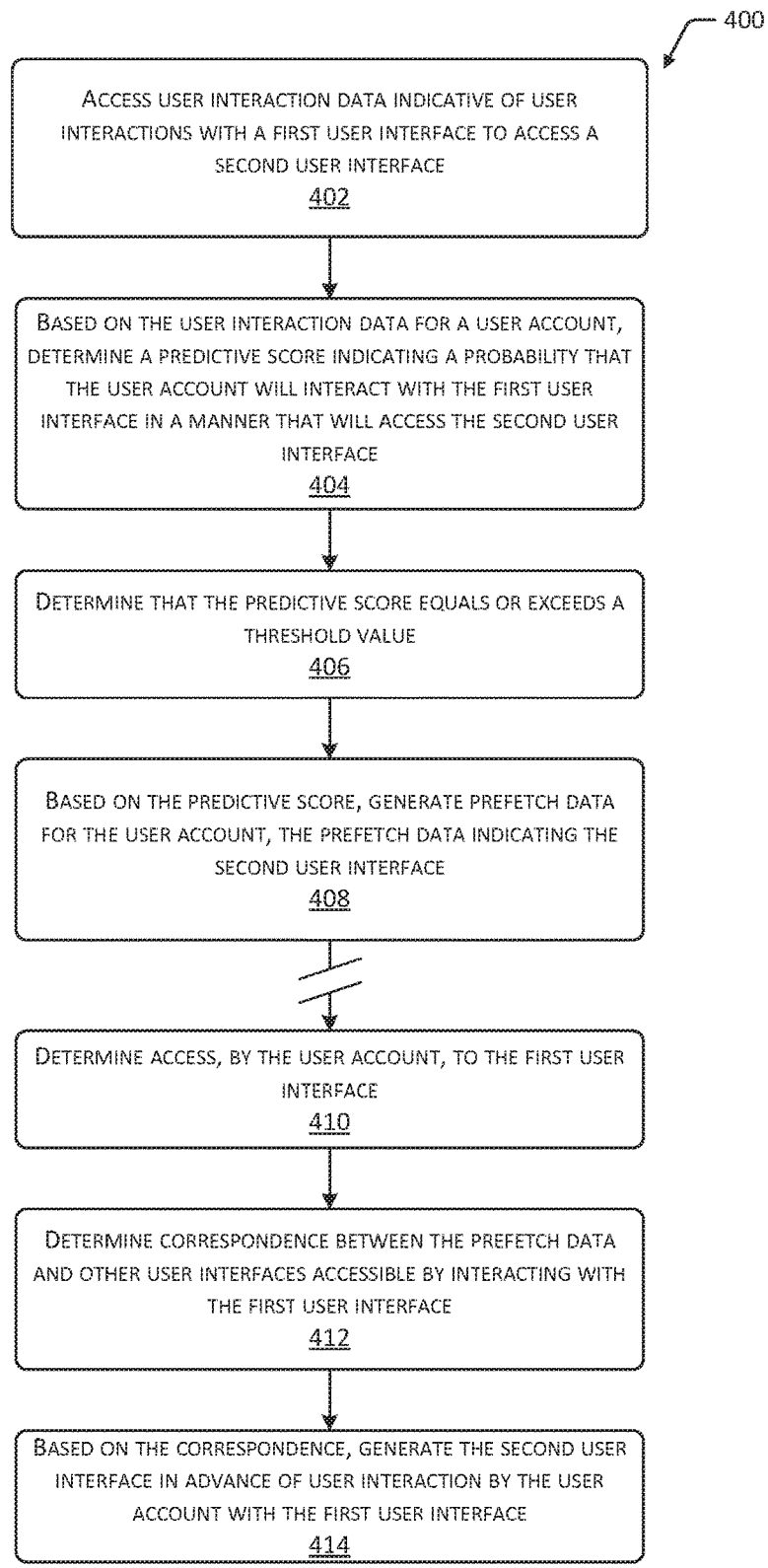
FIG. 4 is a flow diagram illustrating a method for generating prefetch data and pre-generating a user interface based on the prefetch data.

FIG. 4 is a flow diagram 400 illustrating a method for generating prefetch data 116 and pre-generating a user interface 102 based on the prefetch data 116. At 402, user interaction data 118 may be accessed. The user interaction data 118 may be indicative of user interactions 302 associated with a first user interface 102(1). At least a subset of the user interactions 302 may include accessing of a second user interface 102(2). For example, user interactions 302 may include selection of one or more portions of a webpage, such as by using a mouse device, keyboard, touch sensor, or other input device to indicate a particular portion of the webpage configured to navigate to a different webpage. The indicated portions of the web page may include a button, radio selector, drop-down menu, hyperlinked text, or other type of feature associated with navigation from the first user interface 102(1) to a second user interface 102(2). In some implementations, the user interaction data 118 may include user interactions 302 for a predetermined period of time, such as two years. The user interaction data 118 may include user interactions 302 for user accounts across multiple user devices 106, multiple sessions accessing a system 100, and so forth.

At 404, based on the user interaction data 118 for a particular user account, a confidence value or another type of predictive score associated with the second user interface 102(2) may be determined. For example, one or more models 304 may be applied to one or more elements of the user interaction data 118 to determine a predictive score. The score may indicate a probability that the user account will interact with the first user interface 102(1) in a manner that would access the second user interface 102(2). For example, the user interaction data 118 may include a total number of prior user interface accesses 214, by the user account, for the first user interface 102(1), or for other user interfaces 102 having the same or similar user interface categories 216 or user interface features 218. The user interaction data 118 may also include a number of user interface accesses 214, by the user account, to the second user interface 102(2), or other user interfaces 102 having the same or similar user interface categories 216 or user interface features 218, by interacting with the first user interface 102(1). Based on the difference or ratio associated with the number of user interface accesses 214 for the first user interface 102(1) and for the second user interface 102(2), a data processing module 122 may calculate a predictive score, based on one or more models 304. The predictive score may indicate the probability of access by the user account to the second user interface 102(2). In some implementations, other elements of the user interaction data 118, such as those described with regard to FIG. 2, may affect the score. For example, a data processing module 122 may determine correspondence between one or more elements of the user interaction data 118 and associated threshold values 124 to determine the prefetch data 116. Continuing the example, a threshold value 124 may indicate a particular user account location 220 and user account age 222. Based on a particular user account including the particular user account location 220 and user account age 222, prefetch data 116 indicating a corresponding user interface 102 may be generated.

At 406, the predictive score may be determined to equal or exceed a threshold value 124. For example, scores indicating a probability of access, by a user account, to a second user interface 102(2) on more than 60 percent of the instances that the user account accessed the first user interface 102(1), may exceed a corresponding threshold value 124. At 408, based on the predictive score, prefetch data 116 for the user account may be generated. The prefetch data 116 may indicate the second user interface 102(2). Additionally, if the data processing module 122 determines a score that equals or exceeds a threshold value 124 for one or more other user interfaces 102, the prefetch data 116 for the user account may also include indications of other user interfaces 102. The user interfaces 102 indicated by the prefetch data 116 may be generated in advance of user interaction 302 by the user account. In some implementations, the threshold values 124 may be determined by applying a model 304 used to determine the predictive score to current user interactions 302 with a system 100.

In some implementations, the prefetch data 116 for a particular user account may be determined in advance of access by the user account to the first user interface 102(1). For example, based on user interaction data 118 indicative of prior user interactions 302 with various user interfaces 102 of a system 100, prefetch data 116 indicating one or more of the user interfaces 102 may be generated and stored in association with the user account. At 410, access, by the user account, to the first user interface 102(1) may be determined. In some implementations, the access to the first user interface 102(1) may occur a length of time after generation of the prefetch data 116. For example, prefetch data 116 may be generated for a particular user account based on user interactions 302 that occurred up to four years in the past. A user account may then access the first user interface 102(1) six months after the generation of the prefetch data 116. In other implementations, the access to the first user interface 102(1) may occur shortly before, after, or contemporaneously with access by a user account to a system 100. For example, responsive to a login request of a user account, the prefetch data 116 for the user account may be determined. Shortly after or during generation of the prefetch data 116, the user account may access the first user interface 102(1).

One or more other user interfaces 102, including the second user interface 102(2) indicated by the prefetch data 116, may be accessible to the user account by interaction with the first user interface 102(1). At 412, correspondence between the user interfaces 102 indicated in the prefetch data 116 and the user interfaces 102 accessible by interaction with the first user interface 102(1) may be determined. At 414, based on the correspondence, the second user interface 102(2) may be generated in advance of user interaction 302 by the user account with the first user interface 102(1). For example, if the prefetch data 116 indicates that a particular user interface 102, such as the second user interface 102(2), is likely to be accessed by the user account, then responsive to the user account's access to the first user interface 102(1), the second user interface 102(2) may be generated in advance of user interaction 302.

Figure 5:
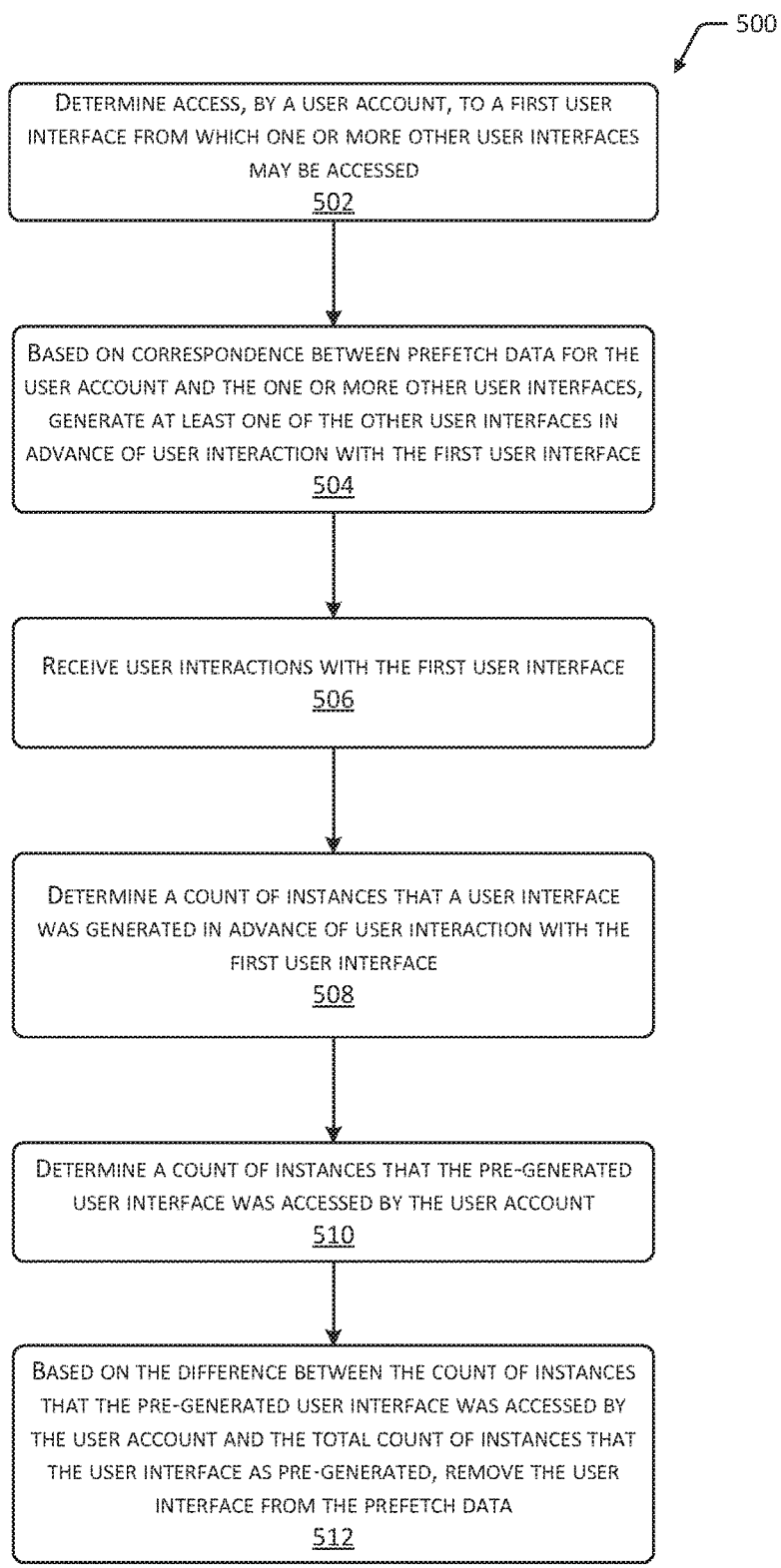
FIG. 5 is a flow diagram illustrating a method for removing indications of particular user interfaces from prefetch data based on user interactions that do not access pre-generated user interfaces.

FIG. 5 is a flow diagram 500 illustrating a method for removing indications of particular user interfaces 102 from prefetch data 116 based on user interactions 302 that do not access pre-generated user interfaces 102. At 502, access by a user account to a first user interface 102(1) may be determined. For example, a user 104 may provide user input, via a user device 106, to log into a user account and access a web page or other type of user interface 102. One or more other user interfaces 102 may be accessible from the first user interface 102(1), such as by providing user input to one or more portions of the first user interface 102(1). For example, a user 104, via a user device 106, may select a link, button, menu item, and so forth, from a web page or other type of user interface 102 to cause a second user interface 102(2) to be presented.

At 504, correspondence between prefetch data 116 for the user account and one or more of the user interfaces 102 accessible by interacting with the first user interface 102(1) may be determined. The prefetch data 116 may include an indication of one or more particular user interfaces 102 that the user account may be likely to access by interacting with the first user interface 102(1). Based on the correspondence between at least one of the user interfaces 102 and the prefetch data 116, one or more of the user interfaces 102 may be generated in advance of user interaction 302 with the first user interface 102(1). For example, user interaction data 118 associated with a particular user account may indicate that a user 104 has regularly purchased a particular food product monthly, during the first week of each month, using the same shipping method, payment method, and shipping address on each occasion. Based on this determination, prefetch data 116 may cause user interfaces 102 associated with the purchase process for the food product to be automatically generated responsive to the user account's access to a first user interface 102(1) providing information about the food product during the first week of a month. This pre-generation of the user interfaces 102 may occur prior to user interaction 302 with the first user interface 102(1), due to the probability, determined from the user interaction data 118, that the user 104 will complete the purchase process for the item. Pre-generation of the user interfaces 102 may reduce latency experienced by the user 104 during the purchase process, improving the user experience and reducing the likelihood that the user 104 may abandon the purchase process due to latency or error. In some implementations, other processes may be automatically initiated responsive to the user account's access to the first user interface 102(1), such as processes to determine applicable payment or shipping methods associated with a purchase, applicable tax rates, and so forth.

At 506, user interactions 302 with the first user interface 102(1) may be received. If the user interactions 302 include access to a pre-generated user interface 102, the pre-generated user interface 102 may be promptly provided to the user device 106 without requiring generation thereof, reducing the latency perceived by the user 104. If the user interactions 302 do not access a pre-generated user interface 102, the subsequent user interface 102 associated with the user interactions 302 may be generated responsive to the user interactions 302. If a large number of user interfaces 102 are pre-generated but not subsequently accessed by a user account, this may unnecessarily consume computing resources, bandwidth associated with a user account or user device 106, and so forth.

At 508, a count of instances that a user interface 102 was generated in advance of user interaction 302 with the first user interface 102(1) may be determined. For example, a user account may have accessed a first user interface 102(1) one hundred times in the past two years. On each occasion, a particular second user interface 102(2) may have been pre-generated based on the prefetch data 116 associated with the user account.

At 510, a count of instances that the pre-generated user interface 102 was accessed by the user account may be determined. For example, while the particular second user interface 102(2) may have been pre-generated one hundred times during the previous two years, a user account may have only accessed the second user interface 102(2) on twenty occasions. On the remaining occasions for which the second user interface 102(2) was pre-generated but not accessed, the computing resources expended to generate the second user interface 102(2) were consumed unnecessarily.

At 512, based on the difference between the count of instances that the pre-generated user interface 102 was accessed by the user account and the total count of instances that the user interface 102 was pre-generated, the user interface 102 may be removed from the prefetch data 116. For example, one or more models 304 or threshold values 124 may be configured to cause the addition of a second user interface 102(2) to the prefetch data 116 if a user account accesses the second user interface 102(2) following at least 40 percent of the instances that the user account accesses the first user interface 102(1) that precedes the second user interface 102(2). Based on the determination that the count of instances that the pre-generated user interface 102 was accessed by the user account falls below a threshold value 124, the pre-generated user interface 102 may be removed from the prefetch data 116. For example, based on the number of user account accesses to a particular user interface 102, the model(s) 304 used to generate the prefetch data 116 indicating the particular user interface 102 may be modified. Continuing the example, the weight associated with one or more elements of user interaction data 118 may be decreased in a manner that causes subsequent generations of the prefetch data 116 to no longer include an indication of the particular user interface 102.

Figure 6:
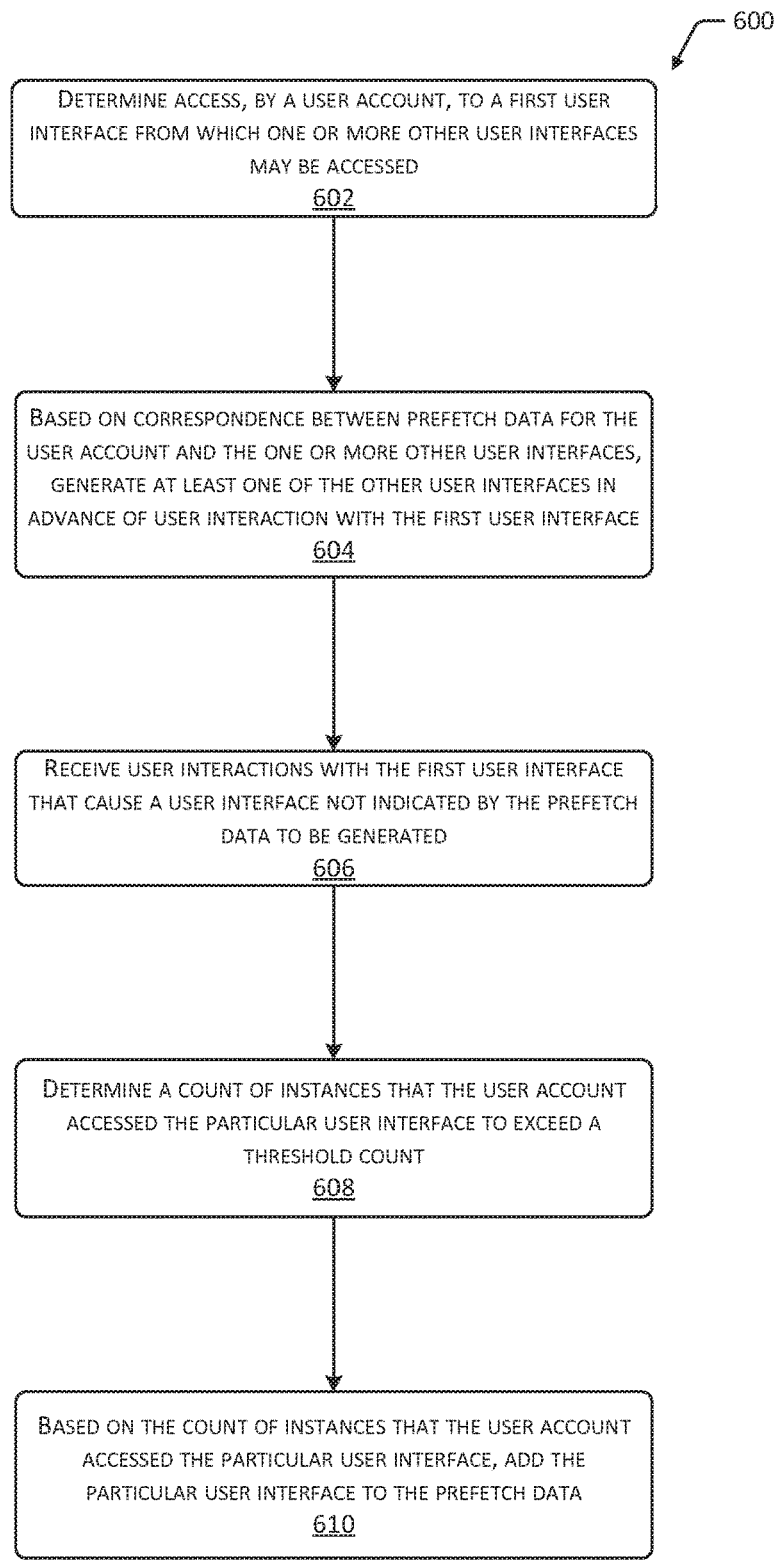
FIG. 6 is a flow diagram illustrating a method for adding indications of particular user interfaces to prefetch data based on user interactions accessing the particular user interfaces.

FIG. 6 is a flow diagram 600 illustrating a method for adding indications of particular user interfaces 102 to prefetch data 116 based on user interactions 302 accessing the particular user interfaces 102. At 602, access, by a user account, to a first user interface 102(1) may be determined. One or more other user interfaces 102 may be accessible from the first user interface 102(1).

At 604, based on correspondence between prefetch data 116 for the user account and the other user interfaces 102 accessible from the first user interface 102(1), at least one of the other user interfaces 102 may be generated in advance of user interaction 302 with the first user interface 102(1). For example, the first user interface 102(1) may include a first webpage associated with the purchase of an item. A user interaction 302 with the first user interface 102(1) may include selection of a payment method associated with purchase of the item. Based on this user interaction 302, it may be determined that the user 104 is likely to continue the purchase process for the item. Responsive to the user interaction 302, one or more additional user interfaces 102 associated with the purchase process may be generated in advance of user interactions 302 that may cause these user interfaces to be presented to the user 104.

At 606, user interactions 302 with the first user interface 102(1) may be received. The received user interactions 302 may include interactions that cause a user interface 102 not indicated by the prefetch data 116 to be generated. For example, after selection of a payment method for purchase of an item, user interfaces 102 associated with completing the purchase of the item may be pre-generated. However, the user 104 may then select a link to navigate to product reviews for the item, other items that are similar or related to the item, and so forth. After accessing the product reviews or similar items, the user 104 may then abandon the purchase process, add the item to an electronic shopping cart, add the item to an electronic wish list, flag the item to be saved for a future purchase, or another user interaction 302 other than completing the purchase process.

At 608, a count of instances that a user account accessed a particular user interface 102 not indicated in the prefetch data 116 may be determined. In some implementations, determining the count of instances that the user interface 102 was accessed may include determining that the count of instances exceeds a threshold value 124. In other implementations, determining the count of instances may include determining a ratio or difference between the count of instances that the particular user interface 102 was accessed and the total count of instances that the preceding first user interface 102(1) was accessed. For example, user interaction data 118 associated with a user account may indicate that the user account has accessed a particular first user interface 102(1) on one hundred occasions during the previous two years. The user interaction data 118 may also indicate that the user account has accessed a particular second user interface 102(2) via user interaction 302 with the first user interface 102(1) on forty two of those instances.

Block 610 adds an indication of the particular user interface 102 to the prefetch data 116 based on the count of instances that the user account accessed the particular user interface 102. For example, based on the determination that a user account has accessed a particular user interface 102 that was not pre-generated on more than 40 percent of the instances that the user account accessed the preceding user interface 102, it may be determined that the latency experienced by the user 104 may be reduced without wasting a significant quantity of computing resources. Based on the determined probability that the user account will access the particular user interface 102, the prefetch data 116 may be modified to cause the particular user interface 102 to be pre-generated during future instances when the user account accesses the preceding user interface. In some implementations, adding an indication of a particular user interface 102 to the prefetch data 116 may include modifying one or more models 304 or threshold values 124 used to determine the prefetch data 116, such that subsequent generation of the prefetch data 116 will include an indication of the particular user interface 102.

Figure 7:
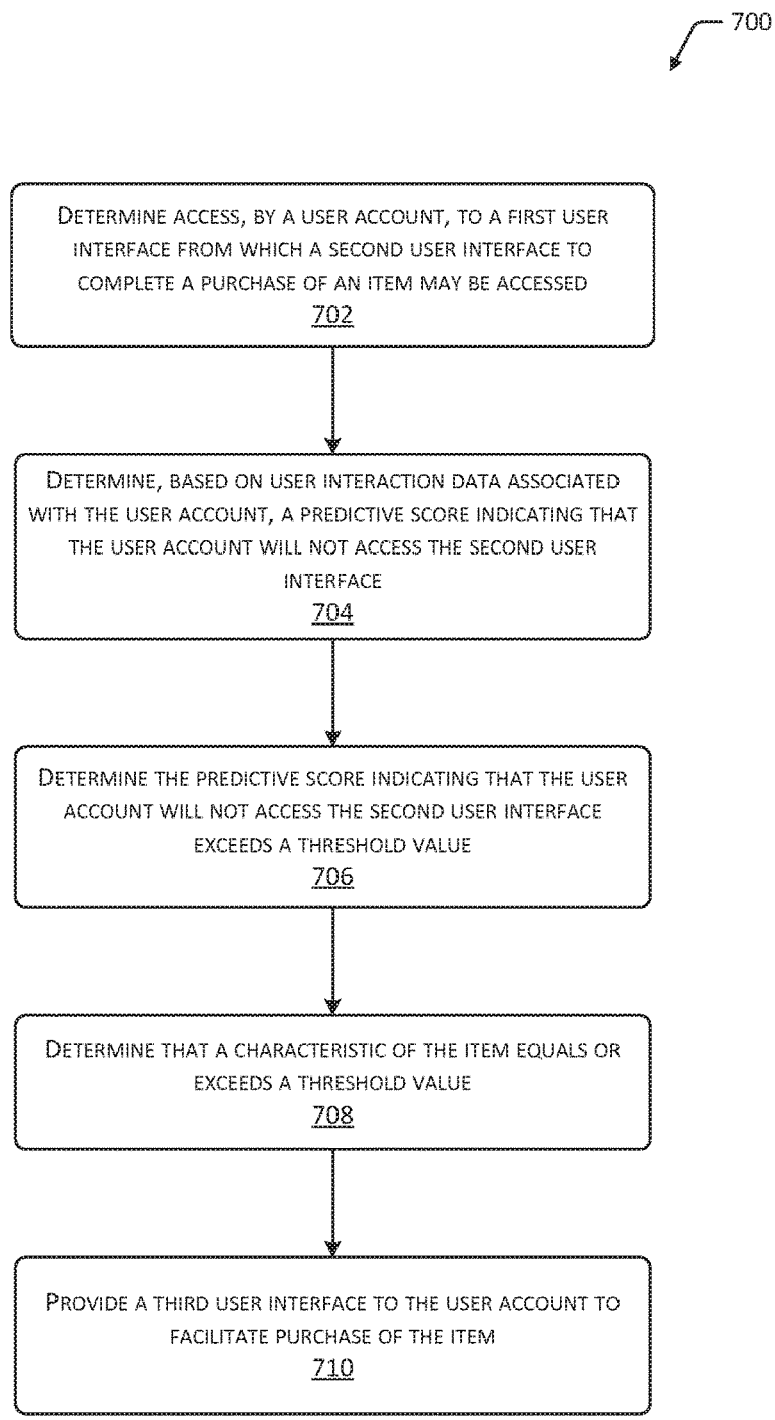
FIG. 7 is a flow diagram illustrating a method for providing a user interface to a user account to facilitate purchase of an item based on an indication that the user account may not complete the purchase process.

FIG. 7 is a flow diagram 700 illustrating a method for providing a user interface 102 to a user account to facilitate purchase of an item based on an indication that the user account may not complete the purchase process. At 702, access by a user account to a first user interface 102(1) may be determined. For example, the first user interface 102(1) may include a webpage indicating an item available for purchase. One or more second user interfaces 102(2) may be accessible from the first user interface 102(1), the second user interfaces 102(2) relating to completion of a purchase of the item. For example, a series of additional user interfaces 102 associated with the purchase process for the item may be accessed by selecting a "buy now" or a "check out" button presented on the first user interface 102(1).

At 704, a predictive score indicating that the user account will not access the second user interface 102(2) may be determined based on user interaction data 118 associated with the user account. For example the user interaction data 118 may indicate that a user's 104 initial payment method to purchase the item was declined. As another example, the user interaction data 118 may indicate that an error occurred during an attempt to purchase the item by the user account. As yet another example, the user interaction data 118 may indicate that on one or more instances, the user account historically has not completed purchases for items that share one or more characteristics with the item presented in the first user interface 102(1). The determined score may indicate a probability that the user account will abandon or fail to initiate the purchase process for the item, or that the user account will access a different user interface 102 rather than purchase the item. For example, at 706, the predictive score indicating that the user account will not access the second user interface 102(2) may be determined to exceed a threshold value 124. Continuing the example, the threshold value 124 may include a value at which the probability of the user account failing to complete the purchase process is greater than 50 percent.

At 708, a characteristic of the item may be determined to equal or exceed a threshold value 124. For example, an item may have a financial value that exceeds a threshold value 124. As another example, an item may be of a particular type or category deemed to be of high importance, such as a medical supply.

At 710, based on the determined predictive score and item characteristic, a third user interface 102 may be provided to the user account to facilitate purchase of the item. For example, if the user interaction data 118 indicates that a user 104 is likely to abandon the purchase of an item having a high financial value, a third user interface 102, such as a chat interface, may be provided to the user account to reduce the probability that the user account will abandon the purchase process.

Figure 8:
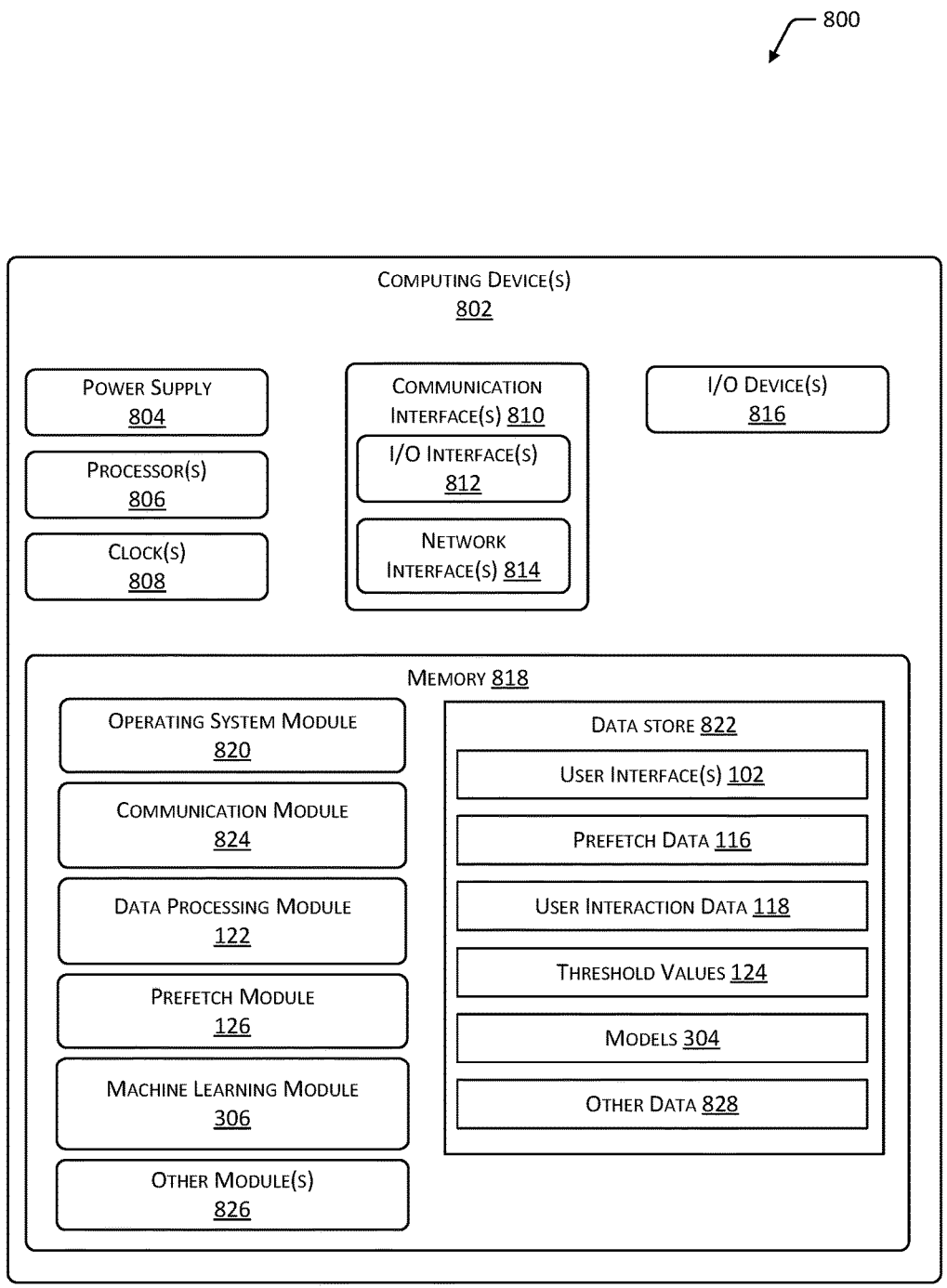
FIG. 8 is a block diagram illustrating a computing device within the scope of the present disclosure.

FIG. 8 is a block diagram 800 illustrating a computing device 802 within the scope of the present disclosure. The computing device 802 may include one or more prefetch servers 114, web servers 128, user devices 106, or other computing devices 802 in communication therewith. For example, while some implementations within the scope of the present disclosure may include a separate prefetch server 114, in other implementations, one or more functions described with regard to the prefetch server 114 may be performed by a web server 128 or by a user device 106.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 806 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components thereof. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with the computing device 802 or with another computing device 802 in communication therewith. For example, I/O devices 816 may include touch sensors, keyboards, mouse devices, microphones, image sensors (e.g., cameras), scanners, displays, speakers, haptic devices, printers, and so forth. In some implementations, the I/O devices 816 may be physically incorporated with a computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including LANs, wireless LANs, WANs, wireless WANs, and so forth. For example, the network interfaces 814 may include devices compatible with Ethernet, Wi-Fi, Bluetooth, ZigBee, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 822 and one or more of the following modules may also be stored in the memory 818. The modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

A communication module 824 may be configured to establish communications with user devices 106 or one or more other computing devices 802. The communications may be authenticated, encrypted, and so forth.

The memory 818 may also store the data processing module 122. The data processing module 122 may generate prefetch data 116 based on user interaction data 118. The data processing module 122 may be configured to determine different elements present in the user interaction data 118 for a particular user account and apply one or more models 304 or threshold values 124 to the user interaction data 118. For example, the user interaction data 118 may include quantitative elements, such as the number of prior instances that a user account accessed a particular user interface 102, and qualitative elements, such as a type or category associated with the particular user interface 102. The models 304 may include one or more rules, algorithms, and so forth, that may be used to determine prefetch data 116 based on the user interaction data 118. For example, the models 304 may include rules that assign numerical values to qualitative elements of user interaction data 118 and algorithms that calculate a confidence value or other type of predictive score based on the determined qualitative and quantitative elements of the user interaction data 118. The data processing module 122 may determine whether the predictive score for a particular user interface 102 equals or exceeds a corresponding threshold value 124. If the predictive score equals or exceeds the threshold value 124, an indication of the corresponding user interface 102 may be included in the prefetch data 116 for the user account.

The memory 818 may additionally store the prefetch module 126. The prefetch module 126 may determine access, by a user account, to a first user interface 102(1) from which one or more other user interfaces 102 may be accessed. The prefetch module 126 may determine the other user interfaces 102 that are accessible by interacting with the first user interface 102(1). The prefetch module 126 may then determine correspondence between the user interfaces 102 indicated in the prefetch data 116 for the user account and the user interfaces 102 accessible from the first user interface 102(1). Based on this correspondence, the prefetch module 126 may cause one or more user interfaces 102 to be generated in advance of user interaction 302 with the first user interface 102(1). For example, the prefetch data 116 for a user account may indicate that a user interface 102 associated with the purchase process for electronic items should be pre-generated for a particular user account. When the user account accesses a web page containing information regarding a tablet computer and a link 112 to purchase the tablet computer, the prefetch module 126 may determine correspondence between the user interface(s) 102 accessible via the link 112 and the prefetch data 116. Based on this correspondence, the user interface(s) 102 associated with purchase of the tablet computer may be generated in advance of user interaction 302 with the web page.

The memory 818 may additionally include the machine learning module 306. The machine learning module 306 may modify one or more of the models 304, threshold values 124, or user interfaces 102 based on additional user interaction data 118 determined from user interactions 302 associated with pre-generated user interfaces 102. For example, an indication of a particular user interface 102 may be included in the prefetch data 116 associated with a user account based in part on demographic information associated with the user 104. The user interface 102 may be pre-generated for the user account on twenty separate occasions. However, the user account may have only accessed the pre-generated user interface 102 three times, and may have performed other actions that did not access the pre-generated user interface 102 on the other seventeen occasions. The machine learning module 306 may determine the number of instances that various user interfaces 102 are generated or accessed and the particular elements of user interaction data 118 that caused the user interfaces 102 to be included in the prefetch data 116. Continuing the example, based on the fact that the user account only accessed a pre-generated user interface 102 on three occasions while the user interface 102 was pre-generated on twenty occasions, the machine learning module 306 may modify one or more models 304 to reduce a weight associated with the demographic information that caused the user interface 102 to be included in the prefetch data 116. The machine learning module 306 may also identify one or more user interfaces 102, not included in the prefetch data 116, that are accessed on at least a threshold number of instances and modify one or more models 304 to increase the weight associated with elements of user interaction data 118 that would cause the user interfaces 102 to be included in the prefetch data 116. In other implementations, the machine learning module 306 may modify one or more threshold values 124 to affect the user interfaces 102 that are included in the prefetch data 116. In still other implementations, the machine learning module 306 may modify characteristics of one or more user interfaces 102, which may affect whether the user interfaces 102 are included in the prefetch data 116. For example, a user account may demonstrate a propensity to purchase items when accessing a user interface 102 having a particular format. The machine learning module 306 may cause one or more user interfaces 102 to be modified to include the particular format.

Other modules 826 may also be present in the memory 818. For example, encryption modules may be used to encrypt and decrypt communications between computing devices 802. The other modules 826 may also include modules for logging interactions with user devices 106 and other computing devices 802. For example logged interactions between computing devices 802 may be used to modify one or more of user interaction data 118 or prefetch data 116.

Other data 828 within the data store 822 may include user input data, such as configurations and settings associated with user devices 106 or other computing devices 802. Other data 828 may also include security data, such as encryption keys and schema, access credentials, and so forth.

In different implementations, different computing devices 802 may have different capabilities or capacities. For example, web servers 128 or prefetch servers 114 may have significantly more processor 806 capability and memory 818 capacity compared to the processor 806 capability and memory 818 capacity of user devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
determine user interaction data indicative of user interactions selecting at least a subset of second user interfaces associated with a first user interface;
assign a weight value to individual user interactions selecting the at least the subset of the second user interfaces;
based on the assigned weight values, determine, based on the user interaction data, a confidence value associated with the at least the subset of the second user interfaces, the confidence value indicating a probability of navigation by a user account to the at least the subset of the second user interfaces by interacting with the first user interface;
determine the confidence value to equal or exceed a threshold confidence value;
generate prefetch data associated with the user account, the prefetch data indicating the at least the subset of the second user interfaces;
determine access, by the user account, to the first user interface;
determine that the at least the subset of the second user interfaces is accessible by interacting with the first user interface;
determine that the prefetch data includes an indication of the at least the subset of the second user interfaces that is linked to the first user interface;
based on the indication of the at least the subset of the second user interfaces included in the prefetch data, render the at least the subset of the second user interfaces in advance of a user interaction with the first user interface; and
receive the user interaction with the first user interface.

2. The system of claim 1, wherein the at least the subset of the second user interfaces includes one or more user interfaces relating to a purchase of an item, the system further comprising computer-executable instructions to:
determine, based on the user interaction data, a count of prior accesses to the first user interface for the user account;
determine, based on the user interaction data, a count of purchases of the item subsequent to accessing the first user interface; and
determine the confidence value based on a ratio of the count of purchases to the count of prior accesses.

3. The system of claim 1, wherein the user interaction data includes a count of prior accesses by the user account to the at least the subset of the second user interfaces subsequent to accessing the first user interface.

4. The system of claim 1, wherein the user interaction data includes one or more of:
at least one device identifier indicative of a device used to access one or more of the first user interface or the at least the subset of the second user interfaces,
at least one browser application used to access the one or more of the first user interface or the at least the subset of the second user interfaces,
a category associated with an item presented using the one or more of the first user interface or the at least the subset of the second user interfaces,
an identifier associated with the item presented using the one or more of the first user interface or the at least the subset of the second user interfaces, a financial cost associated with the item presented using the one or more of the first user interface or the at least the subset of the second user interfaces,
a location associated with the user account,
financial data associated with the user account,
a purchase history associated with the user account,
a search history associated with the user account,
a browsing history associated with the user account, or
an age of the user account.

5. The system of claim 1, wherein computer-executable instructions are further configured to:
determine a first count of the at least the subset of the second user interfaces rendered in advance of user interaction;
determine a second count of at least a second user interface accessed by the user account; and
modify the assigned weight value to the individual user interaction associated with the at least second user interface based on a difference between the first count and the second count, the modifying includes reducing the assigned weight value to affect the at least second user interface to be removed from the prefetch data.

6. The system of claim 1, wherein computer-executable instructions are further configured to:
determine a first count of the at least the subset of the second user interfaces rendered in advance of user interaction;
determine a second count of at least a second user interface accessed by the user account; and
generate a second assigned weight value to the individual user interaction associated with the at least second user interface to indicate that the at least second user interface be included in the prefetch data.

7. A method comprising:
determining access, by a computing device associated with a user account, to a first user interface, wherein one or more second user interfaces are accessible by interacting with the first user interface;
determining user interaction data indicative of user interactions selecting at least a subset of the one or more second user interfaces;
assigning a weight value to individual user interactions associated with the selection of the at least the subset of the one or more second user interfaces;
based on the assigned weight values, determining one or more confidence values that are associated with the at least the subset of the one or more second user interfaces, the one or more confidence values indicating a probability of navigation to the at least the subset of the one or more second user interfaces;
determining at least one of the one or more confidence values exceeds a threshold confidence value;
generating prefetch data indicating the at least the subset of the one or more second user interfaces;
determining correspondence between the prefetch data and the at least the subset of the one or more second user interfaces;
rendering the at least the subset of the one or more second user interfaces;
receiving user interaction with the first user interface, the user interaction selecting a particular second user interface of the at least the subset of the one or more second user interfaces; and
providing the particular second user interface to the computing device associated with the user account.

8. The method of claim 7, wherein the user interaction data includes:
a first count of prior accesses, by the user account, to the first user interface; and
a second count of prior accesses, by the user account, to the at least the subset of the one or more second user interfaces subsequent to accessing the first user interface.

9. The method of claim 7, wherein the user interaction data includes one or more of:
an indication of a user device associated with the user account,
an indication of an application associated with the user device, the application used to access the particular second user interface,
a purchase history associated with the user account,
demographic data associated with the user account, or
user interface data associated with one or more of the first user interface or the particular second user interface.

10. The method of claim 7, wherein the particular second user interface relates to a purchase of an item and the user interaction data includes one or more of:
an identifier associated with the item,
a category associated with the item, or
a financial value associated with the item.

11. The method of claim 7, further comprising:
determining a first count of second user interfaces rendered in advance of user interaction;
determining a second count of second user interfaces accessed by the user account; and
modifying the prefetch data based on a difference between the first count and the second count, the modifying including removing an indication of at least one second user interface from the prefetch data.

12. The method of claim 7, further comprising:
determining a first count of prior accesses, by the user account, for a portion of the one or more second user interfaces different from the at least the subset of the one or more second user interfaces;
determining a second count of prior accesses, by the user account, to the first user interface; and
modifying the prefetch data, based at least in part on the first count of prior accesses and the second count of prior accesses, to include an indication of the portion of the one or more second user interfaces.

13. A system comprising:
one or more memories storing computer-executable instructions; and
one or more hardware processors configured to execute the computer-executable instructions to:
access user interaction data indicative of user interactions associated with a first user interface by a user account, the user interactions including selection of one or more second user interfaces linked to the first user interface by the user account;
assign a weight value to individual user interactions associated with the selection of the one or more second user interfaces linked to the first user interface;
based on the weight values, generate a confidence value indicating a likelihood of selection of the one or more second user interfaces linked to the first user interface;
based on the confidence value, generate prefetch data indicating at least a subset of the one or more second user interfaces to be generated in advance of a user interaction with the first user interface;
determine access, by the user account, to the first user interface;

determine correspondence between the one or more second user interfaces and the prefetch data, the correspondence indicating the at least the subset of the one or more second user interfaces; and generate the at least the subset of the one or more second user interfaces.

14. The system of claim 13, wherein the at least subset of the one or more second user interfaces includes one or more user interfaces relating to purchase of an item, the system further comprising the computer-executable instructions to:

determine, based on one or more of the user interaction data or the prefetch data, a second confidence value indicating a likelihood that the user account will terminate access to the first user interface without accessing the at least the subset of the one or more second user interfaces;

determine, based on item data associated with the item, a value of the item equal to or exceeding a threshold value; and provide a third user interface to the user account to facilitate the purchase of the item.

15. The system of claim 13, wherein the computer-executable instructions to generate the prefetch data comprise the computer-executable instructions to:

determine a first count of instances that the user account accessed the first user interface;

determine a second count of instances that the user account accessed a particular second user interface by interacting with the first user interface;

generate the confidence value to be further based on a ratio of the second count of instances to the first count of instances;

determine the confidence value to equal or exceed a threshold confidence value; and include the particular second user interface in the prefetch data.

16. The system of claim 13, further comprising computer-executable instructions to:

determine a first count of user interfaces rendered based on the prefetch data;

determine a second count of user interfaces accessed by the user account; and based on a difference between the first count of user interfaces and the second count of user interfaces, modify the prefetch data.

17. The system of claim 13, further comprising computer-executable instructions to:

determine a first count of prior accesses by the user account to a particular second user interface different from the at least the subset of the one or more second user interfaces;

determine a second count of prior accesses by the user account to the first user interface; and based at least in part on a ratio of the first count of prior accesses to the second count of prior accesses, modify the prefetch data to include an indication of the particular second user interface.

18. The system of claim 13, wherein the at least the subset of the one or more second user interfaces includes one or more user interfaces relating to purchase of an item, the system further comprising computer-executable instructions to:

determine a count of prior accesses by the user account to a particular second user interface to exceed a threshold count, the particular second user interface configured to complete the purchase of the item within a first time; and provide an indication of a third user interface to the user account, the third user interface configured to complete the purchase of the item within a second time less than the first time.

19. The system of claim 13, wherein the user interaction data includes one or more of:

a device type associated with access by the user account to the first user interface, an application associated with access by the user account to the first user interface, an access frequency associated with access by the user account to the first user interface, a total count of accesses by the user account to the first user interface, a location associated with the user account, a purchase history associated with the user account, a search history associated with the user account, or a browsing history associated with the user account.

20. The system of claim 13, wherein the at least the subset of the one or more second user interfaces includes the one or more second user interfaces relating to purchase of an item, the user interaction data including one or more of a category or a value associated with the item, the system further including computer-executable instructions to:

determine correspondence between the one or more of the category or the value associated with the item and one or more threshold categories or values; and based on the correspondence, generate the prefetch data to include the one or more second user interfaces relating to purchase of the item.

* * * * *